(12) United States Patent
Matsumoto et al.

(10) Patent No.: US 7,170,410 B2
(45) Date of Patent: Jan. 30, 2007

(54) SENSOR DEVICE

(75) Inventors: Kenjirou Matsumoto, Miyazaki (JP); Hiroshi Watanabe, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 181 days.

(21) Appl. No.: 11/042,799

(22) Filed: Jan. 25, 2005

(65) Prior Publication Data

US 2005/0179557 A1   Aug. 18, 2005

(30) Foreign Application Priority Data

Feb. 13, 2004   (JP) ............... 2004-036703

(51) Int. Cl.
*G08B 13/14* (2006.01)
*E05B 65/00* (2006.01)

(52) U.S. Cl. ............... 340/568.1; 340/572.8; 70/57.1

(58) Field of Classification Search .. 340/568.1–572.9; 70/57.1, 439, 440, 443, 458; 257/678, 688
See application file for complete search history.

(56) References Cited

U.S. PATENT DOCUMENTS 4,006,336 A * 2/1977 Boyden ............... 200/246

2005/0030182 A1 * 2/2005 Hogan ............... 340/572.9

FOREIGN PATENT DOCUMENTS

| JP | 2000-206130 | 7/2000 |
|----|-------------|--------|
| JP | 2004-251629 | 9/2004 |

* cited by examiner

*Primary Examiner*—Thomas Mullen
*Assistant Examiner*—Jennifer Mehmood
(74) *Attorney, Agent, or Firm*—Carrier, Blackman & Associates, P.C.; Joseph P. Carrier; William D. Blackman

(57) ABSTRACT

A sensor device includes: a housing; a sensor element embedded in the tip end of the housing, the sensor element having on one side face thereof a magnetically sensitive surface that faces a side of the housing and having a pair of terminal plates extending from a side face that is opposite to the magnetically sensitive surface; and a cord electrically connected to the two terminal plates and extending from a rear part of the housing. The housing is die-molded so as to embed therein a holder formed as a single member from a synthetic resin, the sensor element which is held by the holder in a state in which the two terminal plates are formed so as to have a bent portion bent in a substantially U-shaped form and connected to the sensor element and a flat plate portion extending along a plane intersecting the sensor element and connected to the bent portion, and part of the cord which is electrically connected to the flat plate portion of the two terminal plates.

2 Claims, 12 Drawing Sheets

SENSOR DEVICE

RELATED APPLICATION DATA

The Japanese priority application No. 2004-36703 upon which the present application is based is hereby incorporated in its entirety herein by reference.

BACKGROUND OF THE INVENTION

1. Field of the Invention

The present invention relates to a sensor device that includes a housing formed from a synthetic resin, a sensor element embedded in the tip end of the housing, and a cord connected to the sensor element and extending from a rear part of the housing.

2. Description of the Related Art

Conventionally, there is a known sensor device in which a sensor element is embedded in a housing that is die-molded from a synthetic resin, the sensor device being for use as, for example, a vehicle wheel speed sensor (for example, Japanese Patent Application Laid-open No. 2000-206130).

In this conventional arrangement, the housing is die-molded so as to embed therein a holder having a seating recess, a sensor element seated in the seating recess, a cover body mounted on the holder so as to cover an open end of the seating recess in which the sensor element is seated, and part of a cord connected to the sensor element and guided out of the holder. Therefore, not only are there a large number of components, but also assembly of the plurality of components that are embedded in the housing is complicated.

The present applicant has therefore proposed, in Japanese Patent Application No. 2003-39221, a sensor device in which a housing is die-molded so as to embed therein a holder formed as a single member from a synthetic resin, a sensor element that is directly positioned and held by the holder, and part of a cord connected to the sensor element, thus reducing the number of components and making assembly of the components easy.

In this device, a pair of terminal plates extend linearly from one side face that is perpendicular to a magnetically sensitive surface of the sensor element, and when making the sensor device by using a sensor element that is embedded in the housing so that the magnetically sensitive surface faces a side of the housing, it is possible to avoid an increase in size of the housing. However, when making the sensor device by using a sensor element having a pair of terminal plates extending from a side face that is opposite to the side face on which a magnetically sensitive surface is formed so that the magnetically sensitive surface of the sensor element faces the side of the housing, unless the shape of the terminal plates extending from the sensor element is appropriately designed, there is a possibility that the housing, that is, the sensor device might increase in size.

SUMMARY OF THE INVENTION

The present invention has been accomplished under the above-mentioned circumstances, and it is an object thereof to provide a sensor device in which the number of components can be reduced, the assembly of components can be easily carried out, and further an increase in size to can be avoided.

In order to attain this object, in accordance with a first aspect of the present invention, there is provided a sensor device that includes a housing formed from a synthetic resin, a sensor element embedded in the tip end of the housing, the sensor element having on one side face thereof a magnetically sensitive surface that faces a side of the housing and having a pair of terminal plates extending from a side face that is opposite to the magnetically sensitive surface, and a cord electrically connected to the two terminal plates and extending from a rear part of the housing, wherein the housing is die-molded so as to embed therein a holder formed as a single member from a synthetic resin, the sensor element which is held by the holder in a state in which the two terminal plates are formed so as to have a bent portion bent in a substantially U-shaped form and connected to the sensor element and a flat plate portion extending along a plane intersecting the sensor element and connected to the bent portion, and part of the cord which is electrically connected to the flat plate portion of the two terminal plates.

Furthermore, in accordance with a second aspect of the present invention, in addition to the arrangement of the first aspect, the holder is provided with a positioning portion for positioning and holding the sensor element, and a dividing wall disposed between the two terminal plates which extend from the sensor element held by the positioning portion.

In accordance with the arrangement of the first aspect, since the sensor element, which is a single member, is held by the holder, the number of components can be reduced in comparison with an arrangement in which a cover body is mounted on a holder. Also, since the sensor element is merely assembled to the holder while the cord is electrically connected to the pair of terminal plates extending from the sensor element, assembly of the components is made easy. Moreover, since the terminal plates are formed so as to have the bent portion which is bent in a substantially U-shaped form and connected to the sensor element, and the flat plate portion which extends along the plane intersecting the sensor element and is connected to the bent portion, it is possible to reduce to a relatively low level the amount of sensor element protruding from the plane containing the cord, thus avoiding as much as possible an increase in size of the housing, that is, the sensor device.

In accordance with the arrangement of the second aspect, it becomes easy to position and hold the sensor element with the holder and also to prevent a short circuit between the pair of the terminal plates. Also, it is possible to withstand the pressure of a molten synthetic resin within a die device when die-molding the housing, thus reliably holding the sensor element by the holder.

The above-mentioned object, other objects, characteristics, and advantages of the present invention will become apparent from an explanation of a preferred embodiment that will be described in detail below by reference to the attached drawings.

DESCRIPTION OF THE PREFERRED EMBODIMENT

Figure 1:
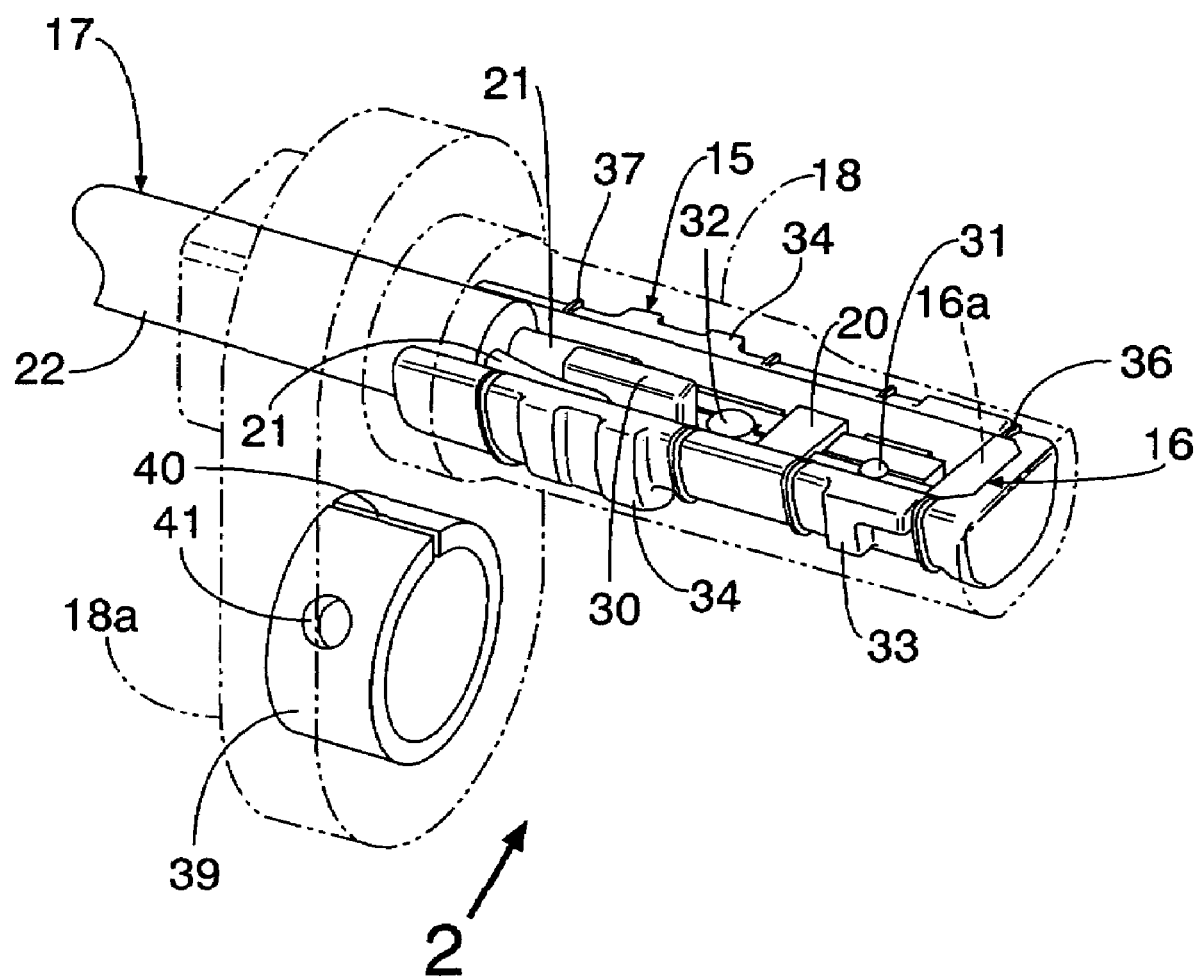
FIG. 1 is a perspective view of a sensor device according to one embodiment of the present invention, from which a housing is omitted.
Figure 2:
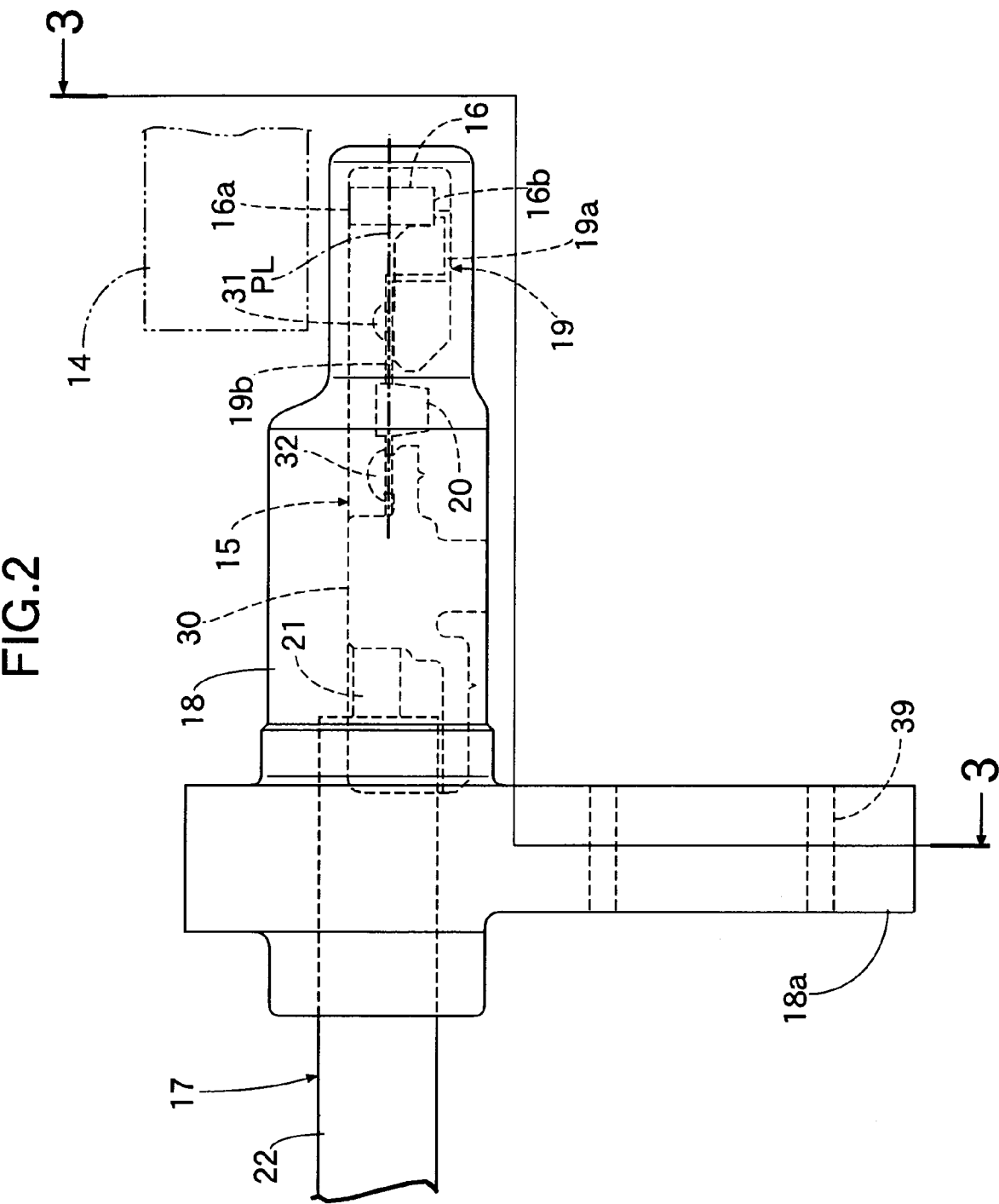
FIG. 2 is a side view of the sensor device when viewed from arrow 2 in FIG. 1.
Figure 3:
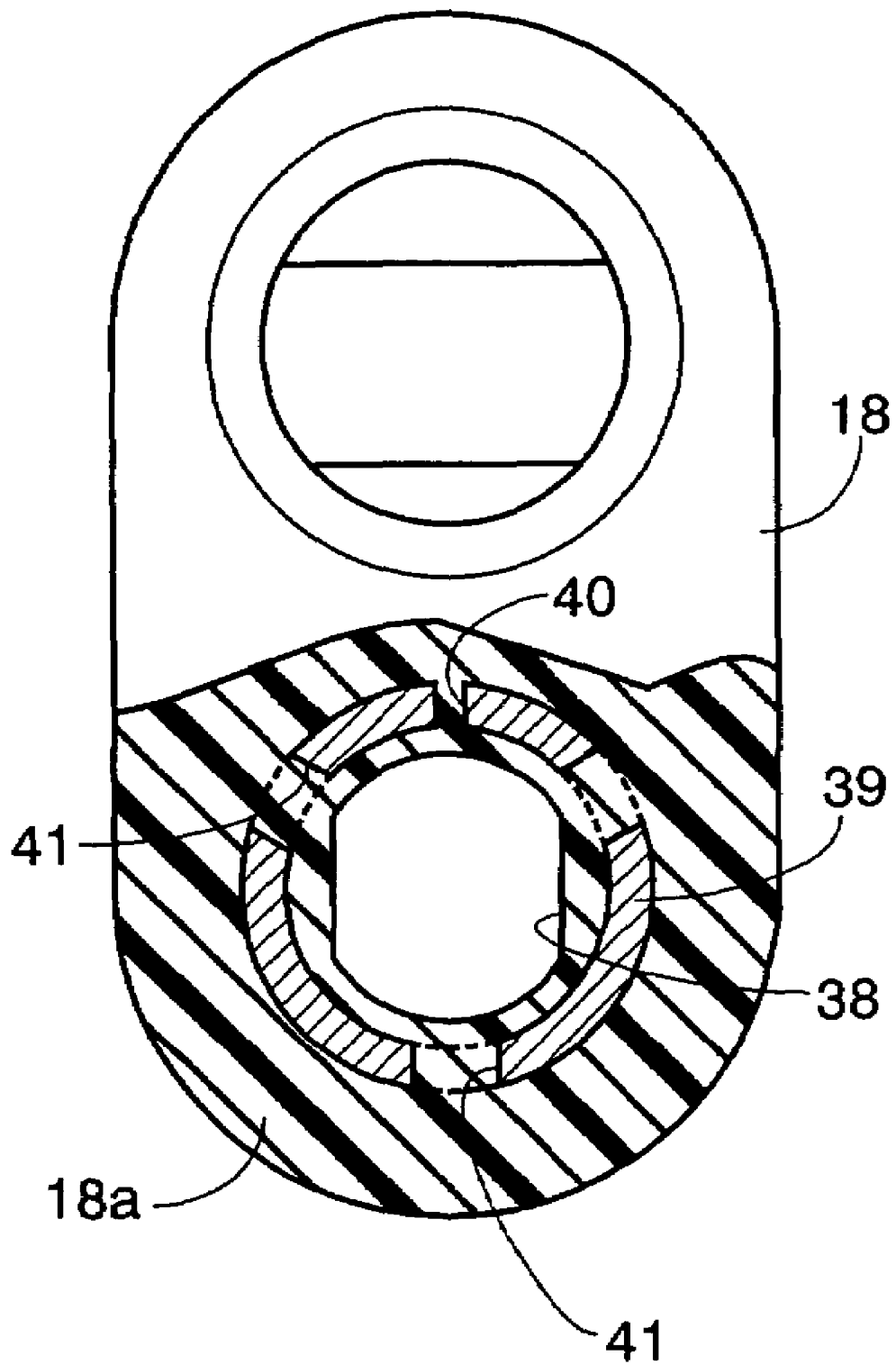
FIG. 3 is a sectional view along line 3—3 in FIG. 2.

Referring first to FIG. 1 to FIG. 3, this sensor device is used as, for example, a vehicle wheel speed sensor; a housing 18 is die-molded from a synthetic resin so as to embed therein a holder 15 formed as a single member from a synthetic resin, a sensor element 16 held by the holder 15, and part of a cord 17 connected to the sensor element 16. The housing 18 is fixedly disposed so that a side face of the tip end of the housing 18 faces one side of the outer periphery of a rotor 14 (see FIG. 2) which rotates together with a wheel.

Figure 4:
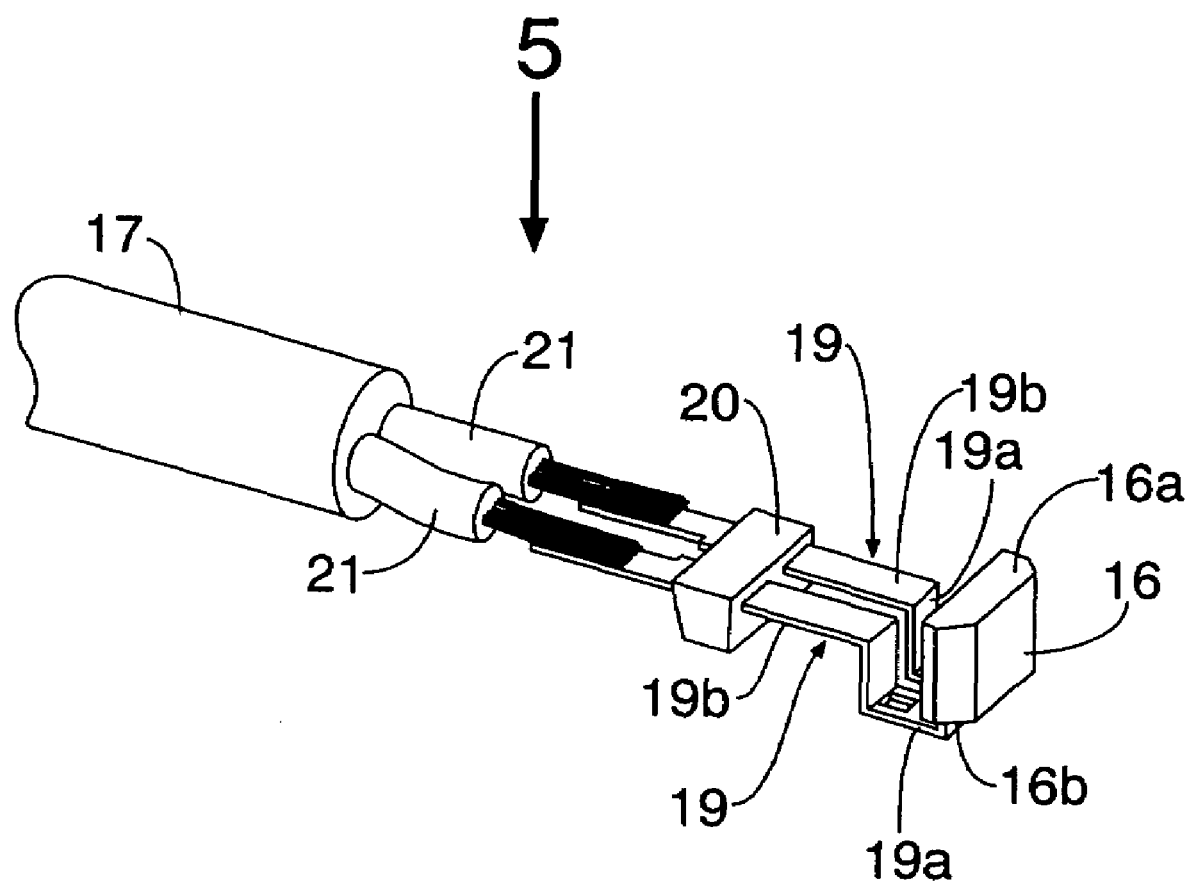
FIG. 4 is a perspective view of a sensor element and a cord in a connected state.
Figure 5:
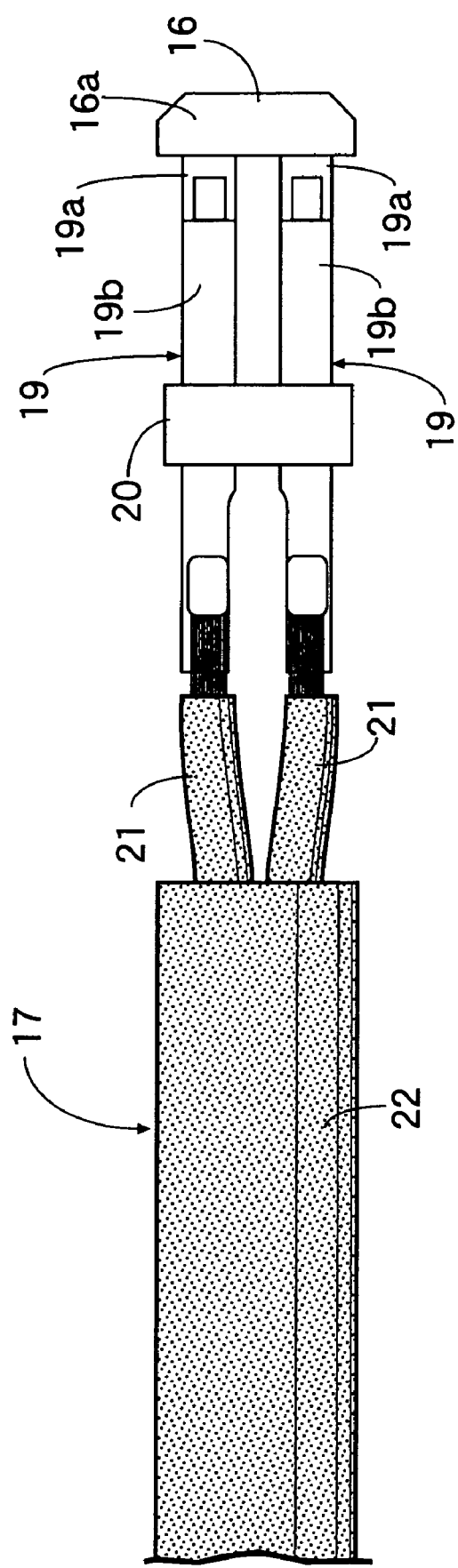
FIG. 5 is a plan view when viewed from arrow 5 in FIG. 4.
Figure 6:
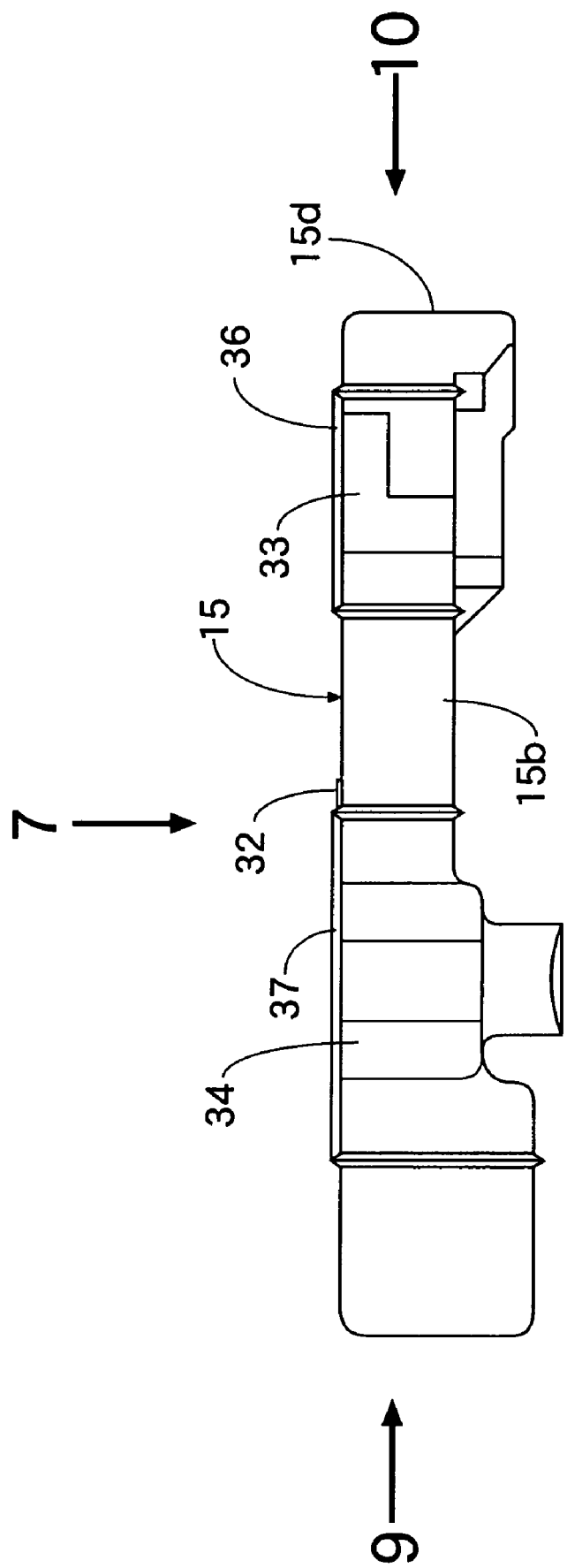
FIG. 6 is a side view of a holder.
Figure 7:
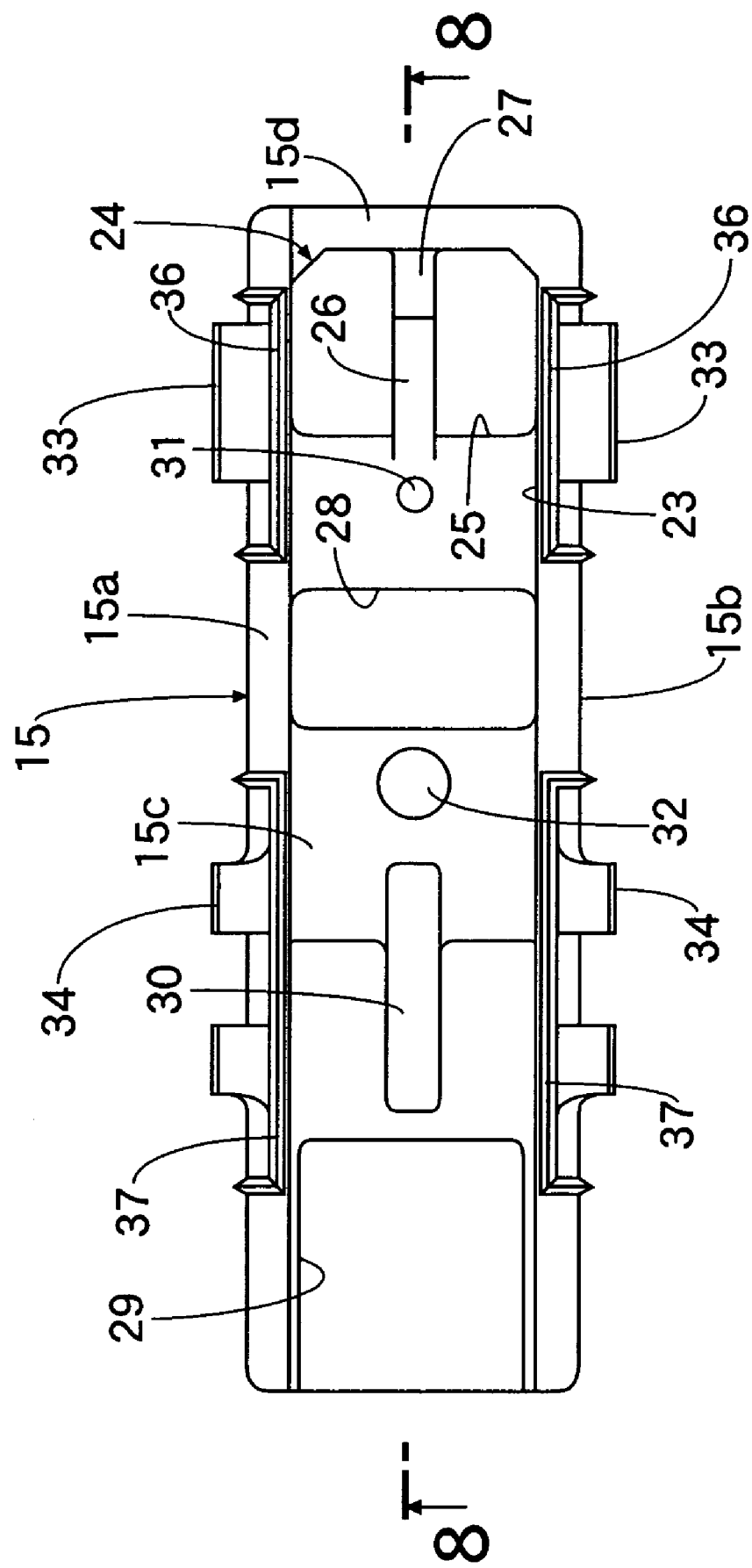
FIG. 7 is view from arrow 7 in FIG. 6.
Figure 8:
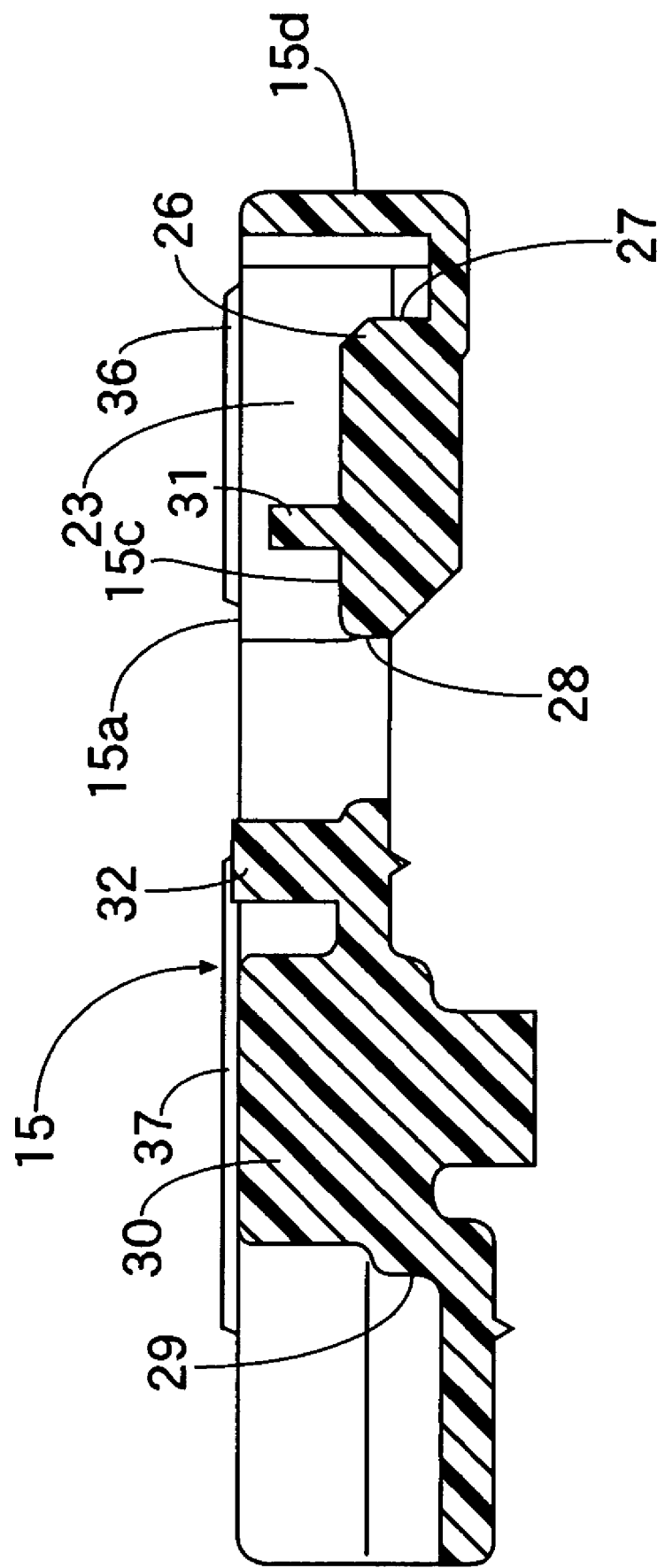
FIG. 8 is a sectional view along line 8—8 in FIG. 7.
Figure 9:
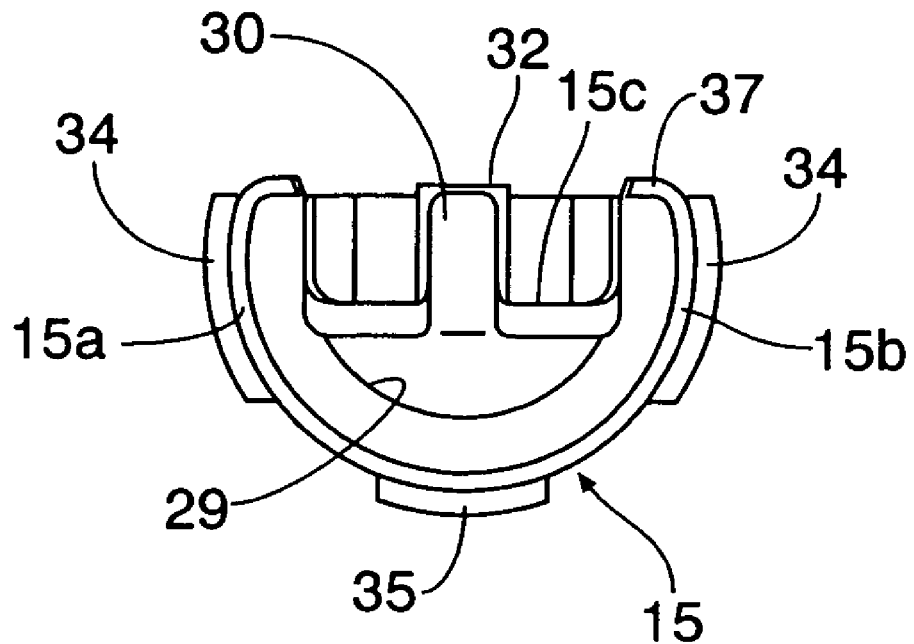
FIG. 9 is a view from arrow 9 in FIG. 6.
Figure 10:
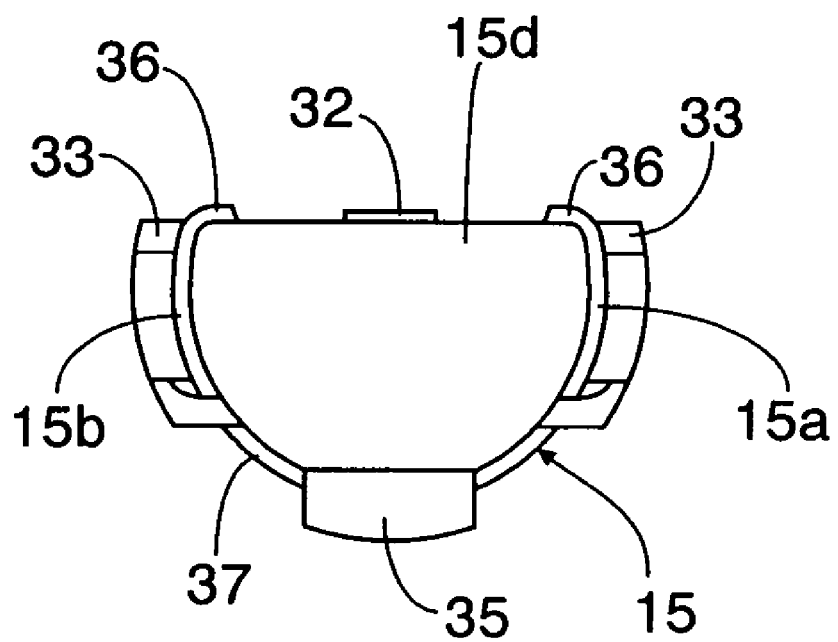
FIG. 10 is a view from arrow 10 in FIG. 6.
Figure 11:
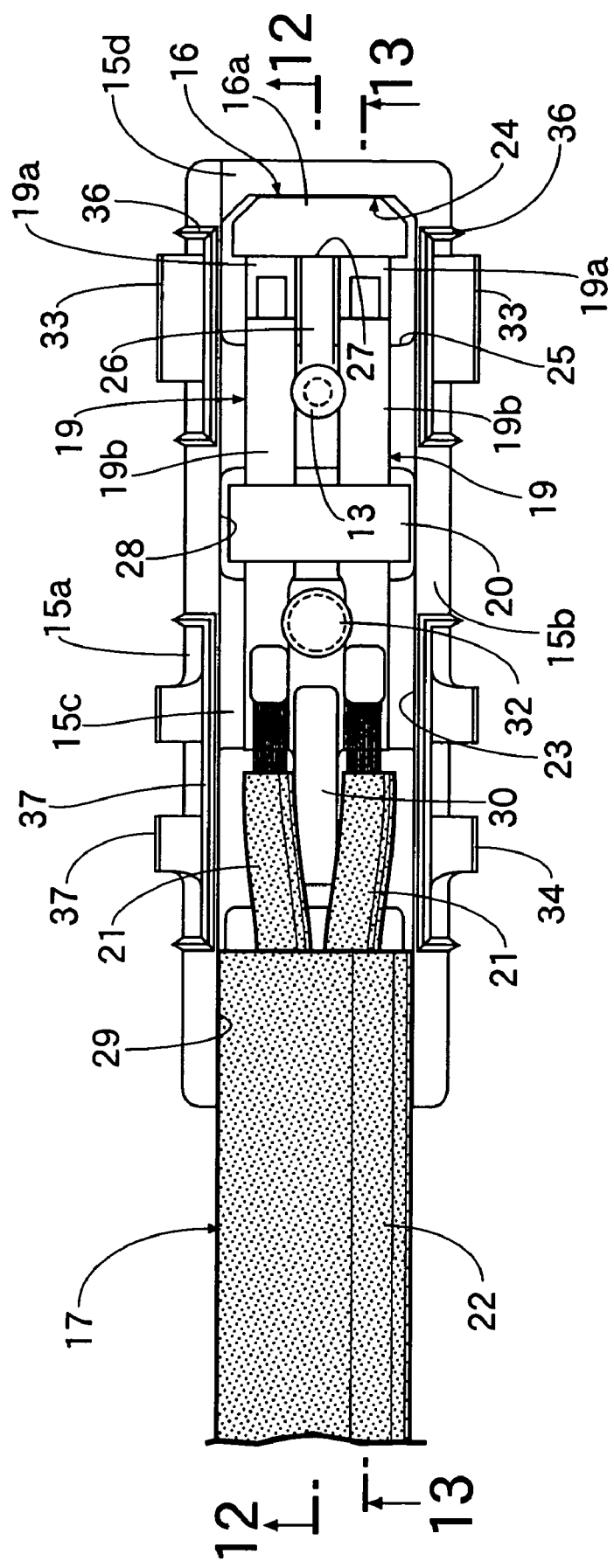
FIG. 11 is a plan view of the holder in a state in which the sensor element and the cord are assembled thereto.

In FIG. 4 and FIG. 5, the sensor element 16, which is a Hall IC, is held by the holder 15 so as to be positioned at the tip end of the housing 18 so that a magnetically sensitive surface 16a formed on one side face of the sensor element 16 faces the rotor 14 side of the housing 18. A module is constituted by the sensor element 16, a pair of terminal plates 19 extending from a side face 16b on the side opposite to the magnetically sensitive surface 16a in the sensor element 16, and a capacitor 20 provided across a middle portion of the terminal plates 19.

The two terminal plates 19 are formed so as to have bent portions 19a bent in a substantially U-shaped form and connected to the sensor element 16, and flat plate portions 19b extending along a plane PL intersecting the sensor element 16 and connected to the bent portions 19a. The capacitor 20 is provided across the middle portions of the two flat plate portions 19b.

The cord 17 is formed by covering a pair of bundled signal wires 21 with an insulating cover material 22 formed from a synthetic resin, and is integrated with the housing 18 so that one end of the insulating cover material 22 is embedded in a rear part of the housing 18 when die-molding the housing 18. A portion of each of the signal wires 21 extending from said one end of the insulating cover material 22 is connected to a rear end of the flat plate portion 19b of the corresponding terminal board 19 by welding or the like.

In FIG. 6 to FIG. 13, the holder 15 integrally has: first and second side wall portions 15a and 15b which are parallel to each other; a base wall portion 15c providing a connection between lower parts of the two side wall portions 15a and 15b; and a front end wall 15d providing a connection between tip ends of the first and second side wall portions 15a and 15b. The holder 15 is provided with a seating channel 23 that is open on the rotor 14 side and a rear side.

The tip end of the holder 15 is provided with a positioning portion 24 for positioning and holding the sensor element 16. The positioning portion 24 is formed from a tip-end-side seating hole 25 and a front section dividing wall 26. The tip-end-side seating hole 25 is provided in the base wall 15c so that the tip end of the seating channel 23 is open on a side opposite to the rotor 14. The front section dividing wall 26 is provided between the base wall 15c and the front end wall 15d while being positioned in a central section between the first and second side walls 15a and 15b so as to divide the tip-end-side seating hole 25 into left and right sections.

A cutout is formed in a part, on the front end wall 15d side, of the front section dividing wall 26, and forms a recess 27, between the front section dividing wall 26 and the front end wall 15d, in which the sensor element 16 can be placed so that the side face 16b of the sensor element 16 can be mounted therein. As a result, the bent portions 19a formed in the terminal plates 19 so as to be connected to the side face 16b of the sensor element 16 are fitted into the tip-end-side seating hole 25 so that the flat plate portions 19b of the terminal plates 19 abut against the base wall portion 15c and the flat plate portions 19b are disposed on either side of the front section dividing wall 26 when the sensor element 16 is placed in the recess 27.

In this way, the sensor element 16 having the magnetically sensitive surface 16a that faces the rotor 14 side is housed between the front section dividing wall 26 and the front end wall 15d so that a part of the side face 16b on the side opposite to the magnetically sensitive surface 16a is placed in the recess 27. A spring force that is exhibited as a result of the bent portions 19a of the terminal plates 19 being fitted into the tip-end-side seating hole 25, pushes the sensor element 16 toward the front end wall 15d, thus positioning and holding the sensor element 16 in the positioning portion 24.

The base wall 15c is provided with a middle section seating hole 28 in a middle section of the holder 15 spaced to the rear from the positioning portion 24, the middle section seating hole 28 also opening the seating channel 23 on the side opposite to the rotor 14. By receiving part of the capacitor 20 in this middle section seating hole 28, the capacitor 20 is positioned and seated in a middle section of the seating channel 23.

A rear end section of the holder 15 is provided with a mating recess 29 so as to deepen a rear end section of the seating channel 23. One end of the insulating cover material 22 of the cord 17 is fitted into this mating recess 29.

In the base wall portion 15c of the holder 15 between the middle section seating hole 28 and the mating recess 29, a middle section dividing wall 30 is projectingly provided integrally with a central section in the width direction of the base of the seating channel 23 so as to be positioned between the two flat plate portions 19b. The middle section dividing wall 30 separates the flat plate portions 19b of the two terminal plates 19, and separates the signal wires 21 of the cord 17 which are electrically connected to the corresponding flat plate portions 19b while being seated within the seating channel 23.

Provided integrally with the holder 15 between the sensor element 16 and the capacitor 20 is a first engagement projection 31 disposed between the flat plate portions 19b of the two terminal plates 19. Provided integrally with the holder 15 between the capacitor 20 and the middle section dividing wall 30 is a second engagement projection 32 disposed between the flat plate portions 19b of the two terminal plates 19. The first and second engagement projections 31 and 32 project from the base of the seating channel 23 and have circular cross-sections. The width of the flat plate portions 19b of the two terminal plates 19 narrows on the side to the rear of the capacitor 20, the gap between the two flat plate portions 19b accordingly increases on the side to the rear of the capacitor 20, and the diameter of the second engagement projection 32 is therefore set to be larger than the diameter of the first engagement projection 31.

Figure 12:
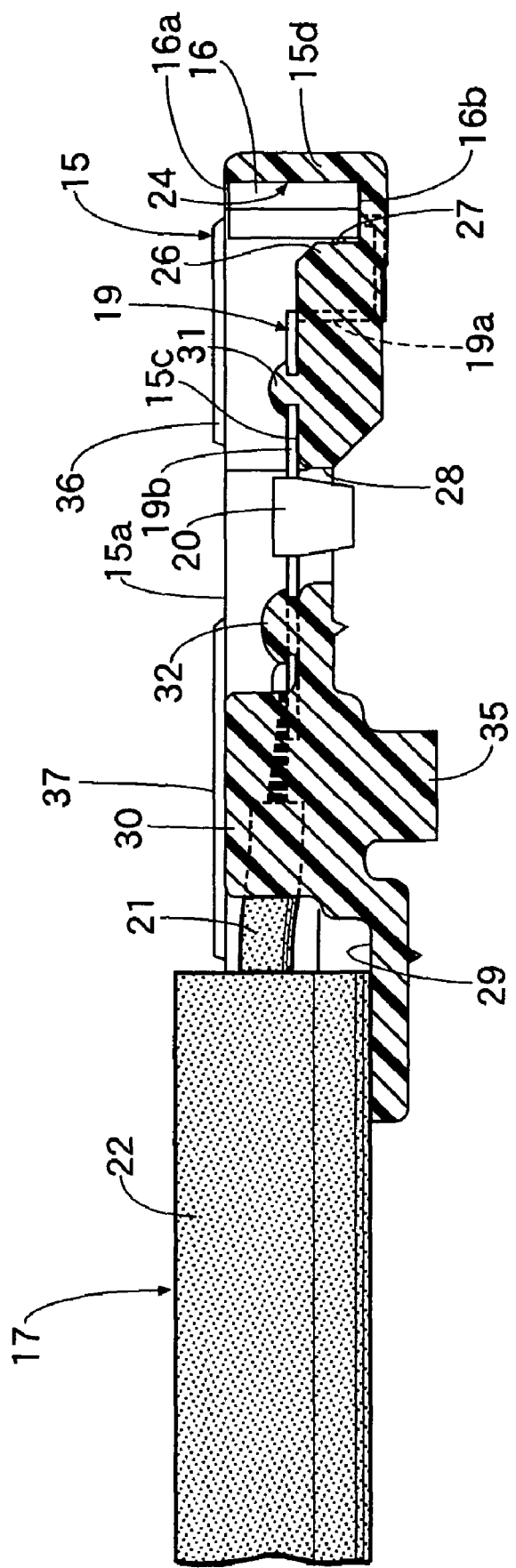
FIG. 12 is a sectional view along line 12—12 in FIG. 11.
Figure 13:
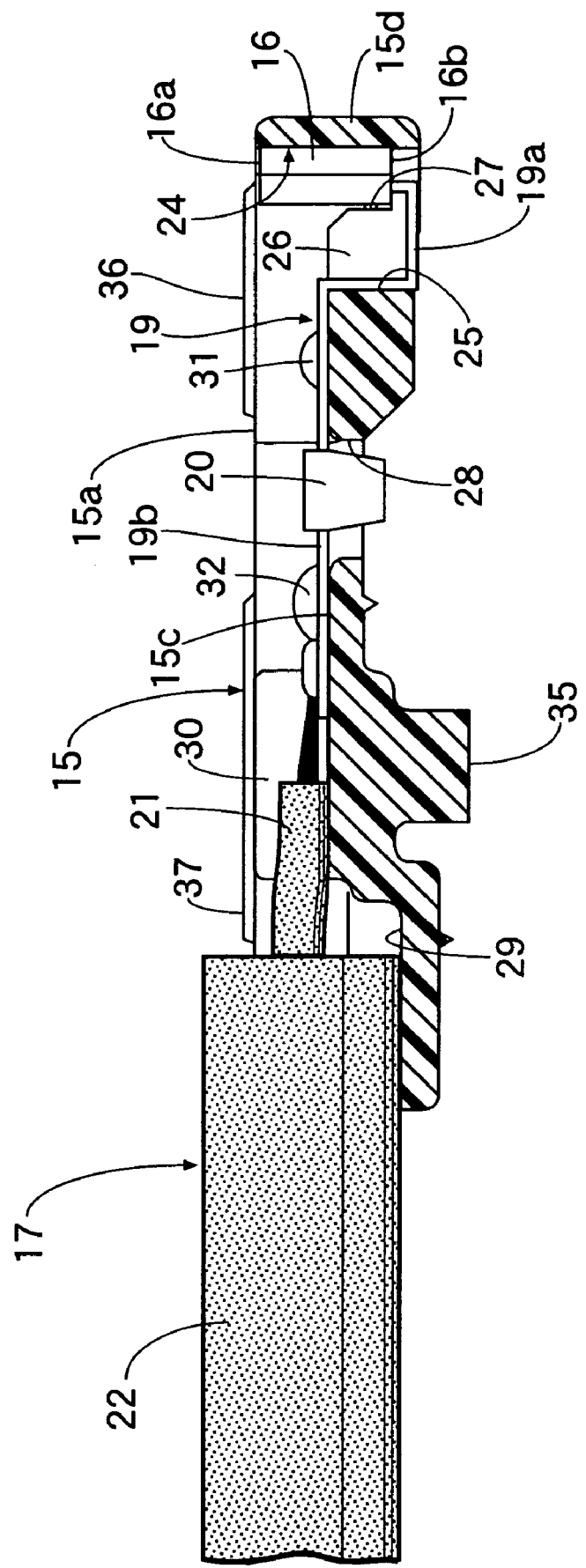
FIG. 13 is a sectional view along line 13—13 in FIG. 11.

Moreover, tip ends of the first and second engagement projections 31 and 32 are engaged with the flat plate portions 19b of the two terminal plates 19 by hot upsetting as shown in FIG. 12 and FIG. 13 while the sensor element 16, the capacitor 20, and the two terminal plates 19 are seated within the holder 15. The two terminal plates 19 are held between the base of the seating channel 23 and the tip ends of the two engagement projections 31 and 32. This enables the sensor element 16, the capacitor 20, the two terminal plates 19, and one end of the cord 17 having signal wires thereof connected to the two terminal plates 19 to be directly positioned and held by the holder 15 which is a single member.

In a state in which the sensor element 16, the capacitor 20, the two terminal plates 19 and said one end of the cord 17 are positioned and held by the holder 15, the holder 15 is inserted into a die device (not illustrated) and a molten hard synthetic resin such as a polyamide mixed with, for example, glass fiber is charged into the die device with the die closed, whereby the housing 18 can be die-molded.

In order to position and hold the holder 15 within the die device, substantially L-shaped supporting projections 33 are projectingly provided integrally with an outer face of a front section of the first and second side wall portions 15a and 15b of the holder 15, substantially U-shaped cross-section supporting projections 34 are projectingly provided integrally with an outer face of a middle section of the first and second side wall portions 15a and 15b of the holder 15, and a circular cross-section supporting projection 35 is projectingly provided integrally with an outer face of the base wall portion 15c of the holder 15 at a position corresponding to the two supporting projections 34. Outer end faces of these supporting projections 33, 34, and 35 become flush with the outer face of the housing 18 after die-molding of the housing 18 is completed.

In order to ensure firm integrity of the holder 15 and the housing 18, endless ridges 36 are projectingly provided on the first and second side wall portions 15a and 15b of the holder 15 so as to surround the supporting projections 33, and an endless ridge 37 is projectingly provided on the outer faces of the two side wall portions 15a and 15b and the base wall portion 15c of the holder 15 so as to surround the supporting projections 34 and 35.

As shown in FIG. 1 to FIG. 3, the housing 18 is provided integrally with a bracket 18a protruding outward. The bracket 18a is provided with an insertion hole 38 through which a bolt (not illustrated) for securing the housing 18 to a support (not illustrated) is inserted. A collar 39 made of metal and surrounding the insertion hole 38 is embedded integrally in the bracket 18a.

The collar 39 has a substantially C-shaped form so as to form a slit 40 between peripherally opposite ends thereof, and has openings 41 at a plurality of positions in the peripheral direction. By making the molten synthetic resin flow into the slit 40 and each of the openings 41, the collar 39 is embedded firmly in the bracket 18a.

The operation of this embodiment is now explained. The sensor element 16 embedded in the tip end of the housing 18 which is formed from a synthetic resin, is directly positioned and held by the holder 15 which is a single member formed from a synthetic resin. The housing 18 is die-molded so as to embed therein the holder 15, the sensor element 16 positioned and held by the holder 15, and part of the cord 17 connected to the sensor element 16.

That is, when the sensor element 16 is embedded in the tip end of the housing 18 which is formed from a synthetic resin, since the sensor element 16 is held by the holder 15 which is formed as a single member from a synthetic resin, the number of components can be reduced in comparison with an arrangement in which a cover body is mounted on a holder. Moreover, the sensor element 16 is merely assembled to the holder 15 while the cord 17 is electrically connected to the pair of terminal plates 19 extending from the sensor element 16, thus making assembly of the components easy.

Furthermore, since the terminal plates 19 are formed so as to have the bent portion 19a which is bent in a substantially U-shaped form and is connected to the sensor element 16, and the flat plate portion 19b which extends along the plane PL intersecting the sensor element 16 and is connected to the bent portion 19a, it is possible to reduce to a relatively low level the amount of sensor element 16 protruding from the plane containing the cord 17, thus avoiding as much as possible an increase in size of the housing 18, that is, the sensor device.

Moreover, since the holder 15 includes the positioning portion 24 for positioning and holding the sensor element 16 and the front section and middle section dividing walls 26 and 30 positioned between the two terminal plates 19 extending from the sensor element 16 held by the positioning portion 24, it is possible to prevent a short circuit between the pair of terminal plates 19 and easily position and hold the sensor element 16 in the holder 15, and also withstand the pressure of the molten synthetic resin within the die device when die-molding the housing 18, thereby reliably holding the sensor element 16 in the holder 15.

In particular, in this embodiment, since the seating channel 23 housing the two terminal plates 19 is formed in the holder 15, the first and second engagement projections 31 and 32 disposed between the two terminal plates 19 so as to project from the base of the seating channel 23 are projectingly provided integrally in the holder 15, and the tip ends of the two engagement projections 31 and 32 are engaged with the two terminal plates 19 by hot upsetting, it is possible to reliably position and hold the two terminal plates 19, that is, the sensor element 16, in the holder 15 as well as more reliably withstand the pressure of the molten synthetic resin within the die device when die-molding the housing 18, thereby reliably holding the sensor element 16 in the holder 15.

Although an embodiment of the present invention has been explained in detail above, the present invention is not limited by the embodiment and can be modified in a variety of ways without departing from the subject matter of the present invention.

What is claimed is:

1. A sensor device comprising:
   a housing formed from a synthetic resin;
   a holder formed as a single member from a synthetic resin;
   a sensor element embedded in the tip end of the housing, the sensor element having on one side face thereof a magnetically sensitive surface that faces a side of the housing and comprising a pair of terminal plates extending from a side face that is opposite to the magnetically sensitive surface; and
   a cord electrically connected to the two terminal plates and extending from a rear part of the housing;
   wherein the housing is die-molded so as to embed therein the holder, the sensor element which is held by the holder in a state in which the two terminal plates are formed so as to have a bent portion bent in a substantially U-shaped form and connected to the sensor element and a flat plate portion extending along a plane intersecting the sensor element and connected to the bent portion, and part of the cord which is electrically connected to the flat plate portion of the two terminal plates.

2. The sensor device according to claim 1, wherein the holder is provided with a positioning portion for positioning and holding the sensor element, and a dividing wall disposed between the two terminal plates which extend from the sensor element held by the positioning portion.

* * * * *